Sept. 12, 1939.　　　A. B. HOLTZMAN ET AL　　　2,173,000
METHOD OF AND APPARATUS FOR THE MANUFACTURE
OF CRACKERS, BISCUITS, AND THE LIKE
Filed July 31, 1936　　　4 Sheets-Sheet 1

Inventors
Allen B. Holtzman.
David Schett.
By Emery, Booth, Holcomb & Miller
Attorneys

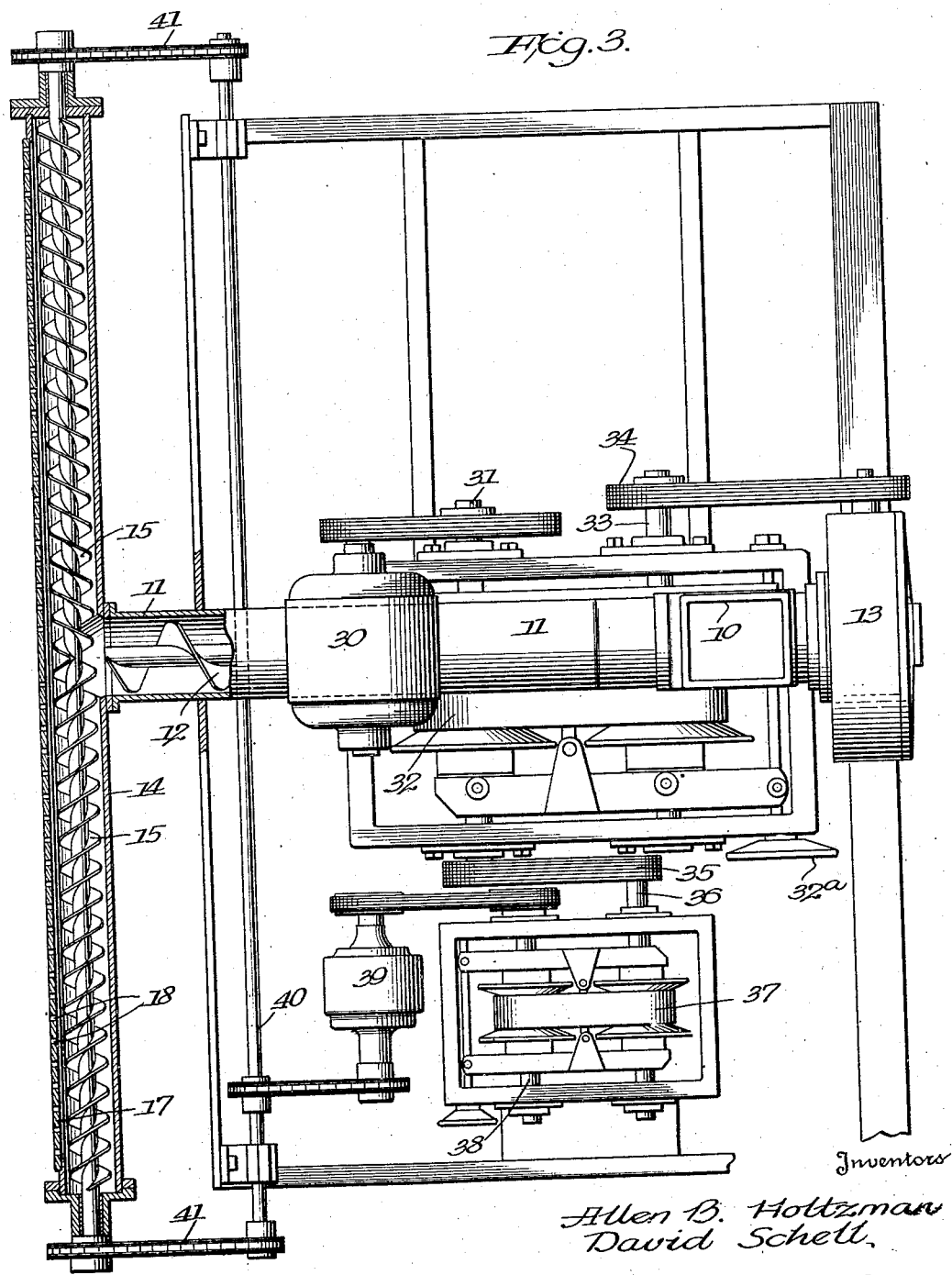

Sept. 12, 1939.  A. B. HOLTZMAN ET AL  2,173,000
METHOD OF AND APPARATUS FOR THE MANUFACTURE
OF CRACKERS, BISCUITS, AND THE LIKE
Filed July 31, 1936  4 Sheets-Sheet 3
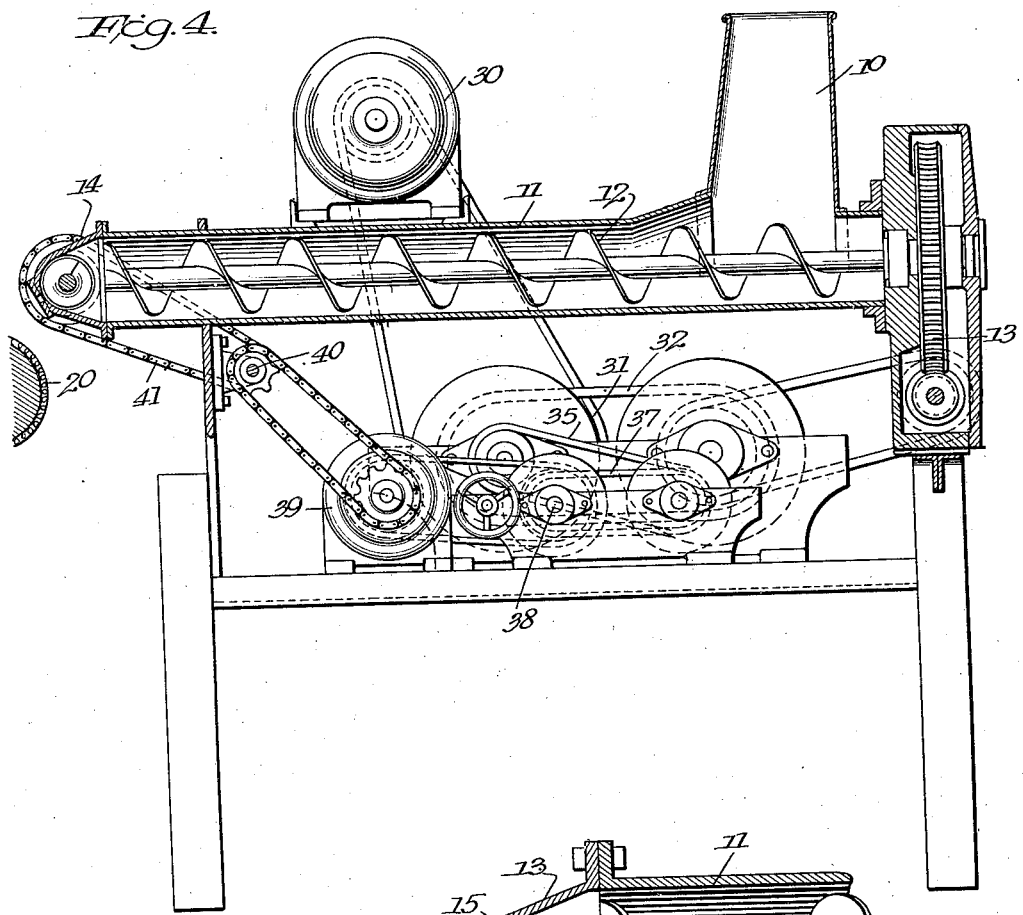
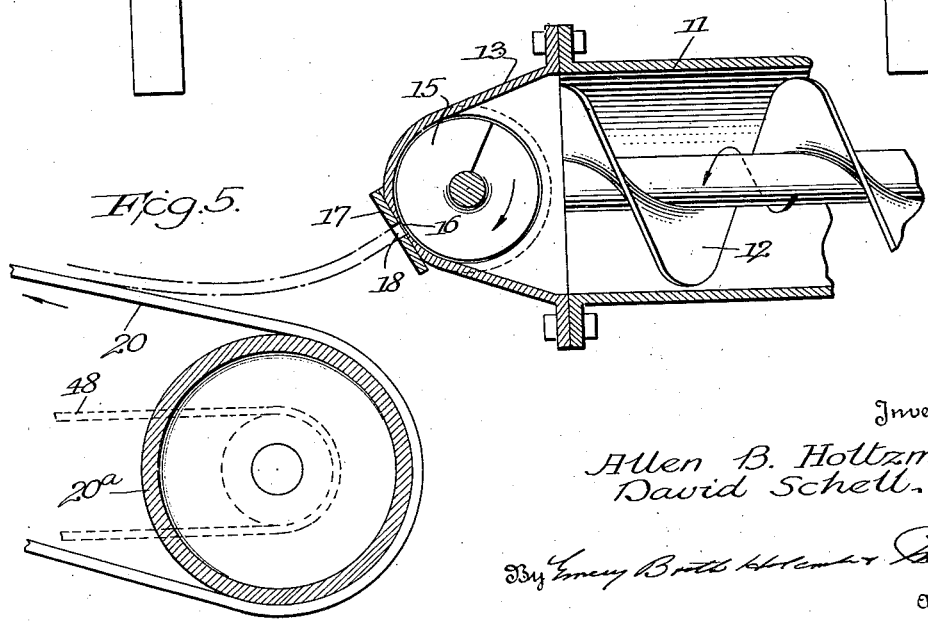
Inventor
Allen B. Holtzman
David Schell

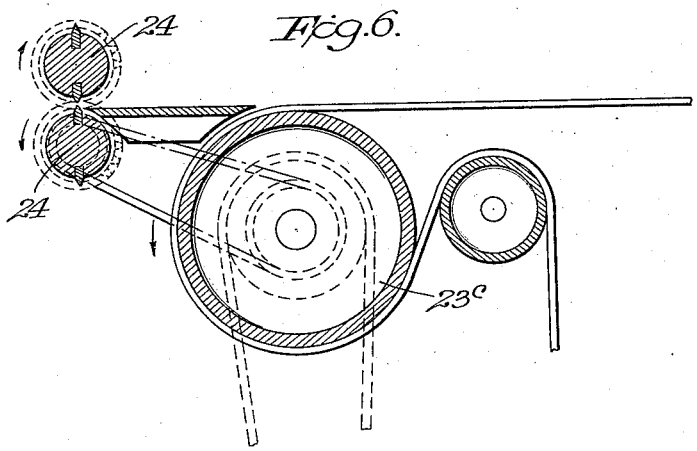
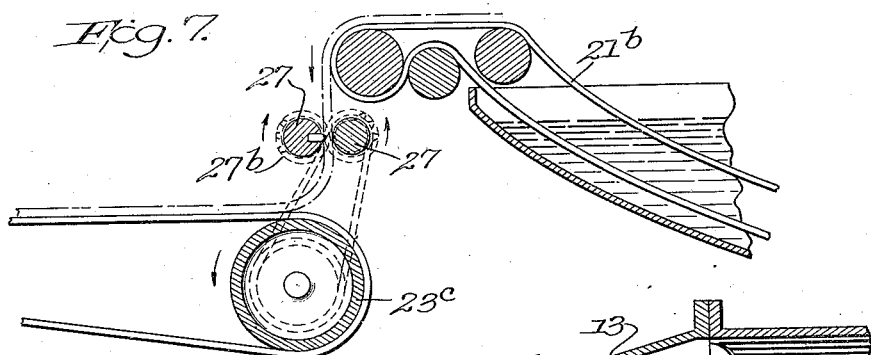
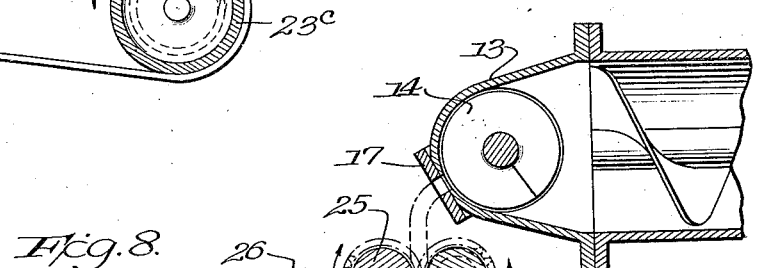
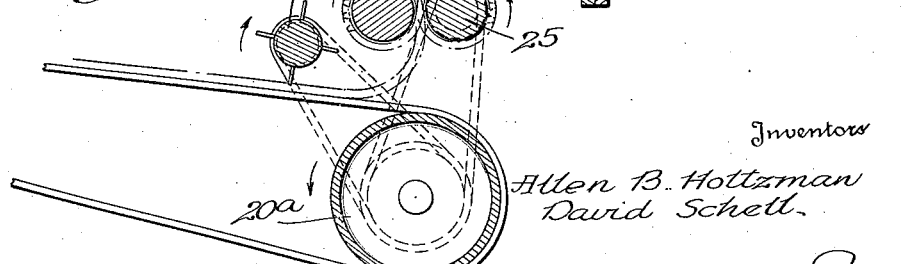

Patented Sept. 12, 1939

2,173,000

UNITED STATES PATENT OFFICE 2,173,000

METHOD OF AND APPARATUS FOR THE MANUFACTURE OF CRACKERS, BISCUITS, AND THE LIKE

Allen B. Holtzman and David Schell, Myerstown, Pa., assignors to Holtzman's Inc., a corporation of Pennsylvania Application July 31, 1936, Serial No. 93,682

9 Claims. (Cl. 107—54)

The present invention relates to the method of and apparatus for making crackers, biscuits and the like, and aims particularly to improve existing methods of making crackers and biscuits either in cylindrical stick form or wafer form.

Our invention has for some of its primary objects the improvement of the method as well as of the apparatus for the continuous manufacture of crackers and biscuits, as well as to provide means for variably regulating and controlling the machine for the production of a uniform product. Other subordinate objects of the invention will be apparent to those skilled in the art from a more detailed description of the method and apparatus.

In order to fully explain our invention, there is illustrated and described one embodiment thereof designed for the manufacture of stick-like crackers simulating pretzels in taste and color, although it is to be understood that the invention is not restricted to the manufacture of such product.

In the drawings—

Fig. 3 is a plan view of the strip-forming mechanism, parts being shown in section better to illustrate the construction;

Fig. 4 is a central longitudinal sectional view taken on the line 4—4 of Fig. 3, the driving mechanism being illustrated in elevation;

Fig. 5 is an enlarged detail sectional view of the discharge end of the strip-forming mechanism;

Figs. 6 and 7 are detail views of the breaking and scoring rolls respectively; and Fig. 8 is a detail view illustrating one manner of utilizing the invention for the manufacture of wafer crackers.

Figure 1:
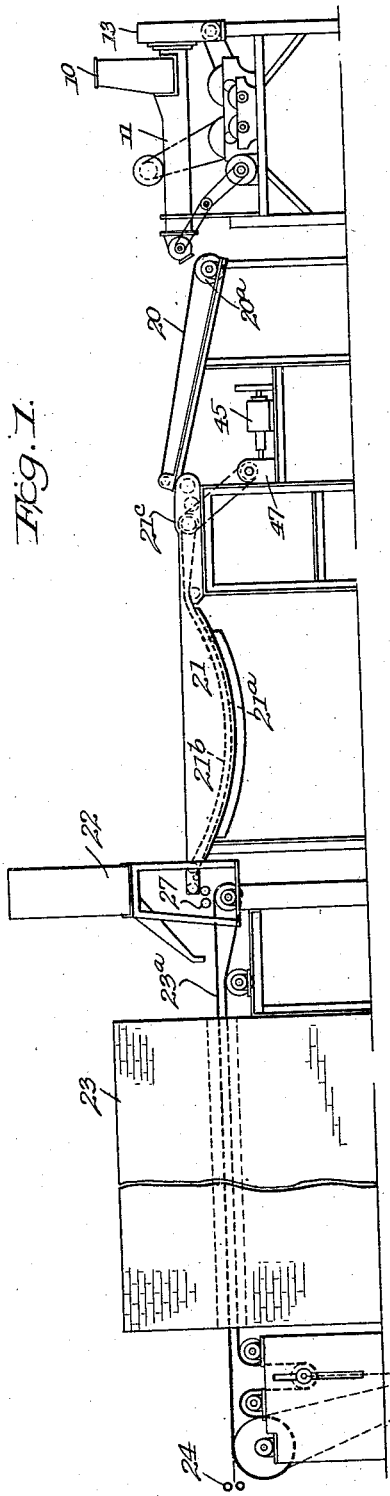
Fig. 1 is a diagrammatic side elevation of a machine for making crackers or biscuits according to our invention.

According to the invention, a batch of green dough is fed into the feed end of the machine, which batch is automatically sub-divided into a plurality of strips or ribbons, preferably arranged in a horizontal series, which strips or ribbons are automatically and continuously conveyed through the machine including an oven, to be baked into finished articles, all without intermediate handling.

More specifically a batch of dough material is fed into a hopper 10 of a strip-forming machine, and advantageously this hopper is kept sufficiently full to insure a continuous feeding of the dough material through the machine. The hopper 10 communicates with a worm conveyor casing 11 having a single feeding worm 12 therein constantly driven through suitable speed reducing gearing 13 of any desirable construction. The function of the worm 12 is to form the dough into a batch of uniform diameter or cross section, and to subject the batch so formed to pressure to feed it through an extruding machine.

The forward end of the conveyor casing 11 communicates centrally with a transversely disposed distributor casing 14, having a distributing worm 15 rotatably mounted therein and driven independently of the conveyor 12. The worm 15 is oppositely threaded, that is, the flutes on one side of the longitudinal center of the casing 11 are right-handed, and on the opposite side they are left-handed (see Fig. 3) so as to convey the dough in opposite directions from the conveyor 12, and uniformly distribute the dough across the machine under uniform pressure. The forward face of the casing 14 is slotted, as at 16, substantially throughout its length and the slotted portion may be covered by a plate 17 having a transverse series of openings 18 of desired shape, through which the dough may be extruded in continuous strip or ribbon form across the machine.

In the illustrated example, the die plate is designed for the manufacture of crackers or biscuits of cylindrical stick form, and hence the die openings 18 may be cylindrical and spaced on centers of ½ to ¾ of an inch. Thus a multiplicity of dough ribbons or strips are continuously extruded from the casing 14 in transverse alignment across the machine which may be of any desired width according to the output desired.

The transverse row of dough ribbons issuing from the strip machine are delivered upon a suitable conveyor, preferably a woven wire foraminous conveyor 20 designed to convey the continuous dough ribbons to a suitable oven. The conveyor 20 advantageously has a surface speed slightly in excess of the speed at which the dough is extruded through the die openings 18, so as to avoid folding of the green dough strip.

In making crackers or biscuits, either in wafer or stick form simulating the flavor and taste of pretzels, it is advantageous to first pass the continuous dough strips through a cooker 21 (see Figs. 1 and 2) of a caustic solution to partially cook the dough in the liquid solution, and then pass the partially cooked dough strips under a salting machine 22, designed to sprinkle salt on the outer surface of the crackers just prior to passing into the oven 23.

The cooker 21 may be of any suitable construction and design sufficient for the purpose. It may advantageously include a pan 21ª adapted to hold a quantity of caustic solution, and a driven conveyor 21ᵇ, adapted to convey the continuous dough ribbons through the cooking bath. Preferably the cooker conveyor has a speed slightly in excess of the speed of the conveyor 20 and advantageously has its own variable speed drive separate from the strip machine drive, by means of which its speed can be regulated with reference to the speed of the strip machine.

The cooking operation need be of very short duration, usually less than one minute's duration, sufficient to partially cook a surface layer to provide a crust when the biscuit is finished. As the partially cooked dough strip emerges from the cooker, its surface is somewhat tacky, and it may be sprinkled with salt from a salting machine 22 of any approved construction. The construction of the cooker 21 and the salting machine are not shown in detail herein, as the details of these mechanisms, per se, form no part of the present invention, and any desirable construction of cooker and salting machine capable of treating the material as it is continuously moved therethrough may be used.

After the strips of dough have been formed of desired shape and cross section, and after they have been preliminarily cooked and salted when the flavor and taste of pretzels is desired, they are ready for baking, which advantageously is done in a continuous travelling oven 23 having an endless conveyor 23ª for continuously conveying the ribbons of dough through the oven. The conveyor 23ª is advantageously driven by any suitable means, preferably by a separate drive 23ᵇ so that the speed of the oven conveyor may be slightly in excess of the speed of the preceding conveyor. It will be obvious that the oven must be of such dimension and construction as to provide a sufficient degree of baking heat for a sufficient time to thoroughly bake the particular crackers or biscuits being made.

As the thoroughly baked strips emerge from the baking oven, they may be passed through suitable breaker or cutter rolls 24 for breaking the strips into biscuits of desired length. These breaker rolls may be of any desired construction and preferably comprise a pair of geared ribbed rolls mounted in a suitable bracket 24ª, driven by any suitable source, as for example, from the end roll of the oven conveyor 23ª (see Fig. 6).

The invention is not restricted to the manufacture of crackers and biscuits in stick form, but also embraces the manufacture of such articles in wafer form. For this purpose the die openings 18 of the strip-forming machine may be elongated if desired, to initially produce a continuous strip of desired width and thickness. Or the diameter of the circular strip may be increased, and the strip flattened between flattening rolls 25 (see Fig. 8).

In the manufacture of wafer-like crackers it is desirable to puncture the upper surface of the crackers so as to permit of the rapid escape of steam generated in the crackers when they enter the baking oven. For this purpose a needle roll 26, above a plain surfaced roll, may be provided to engage the upper surface of the strip and puncture the upper surface of the green dough strip at desired intervals.

Figure 2:
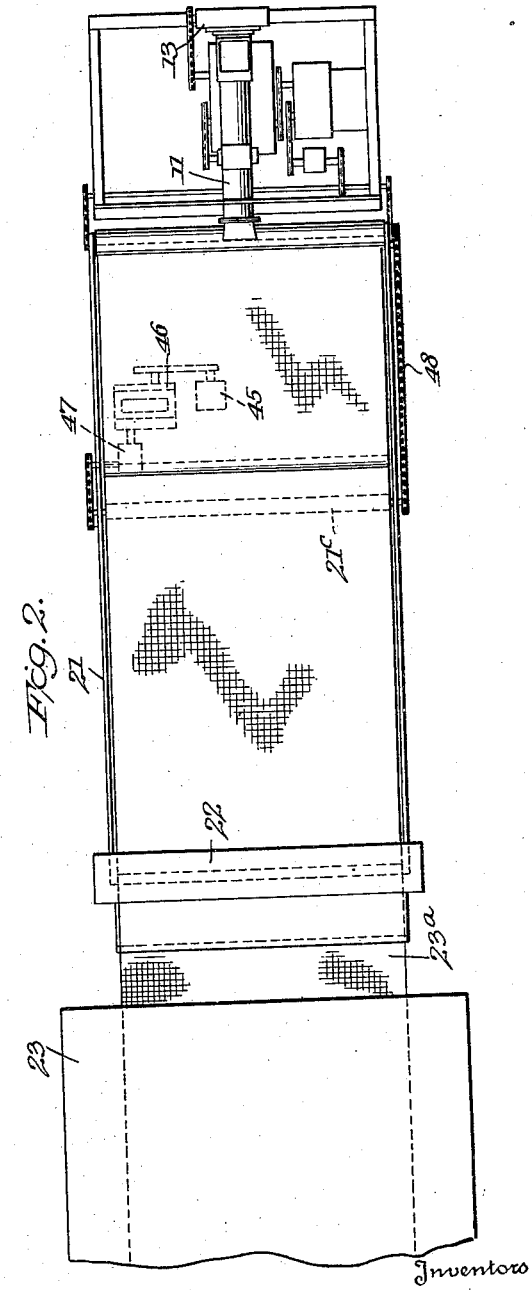
Fig. 2 is a diagrammatic plan view thereof.

In some cases it is desirable to insure that the crackers or biscuits are of certain predetermined length when finally delivered from the machine. To this end the green dough strips may be scored or cut, at some point after leaving the strip machine and prior to entering the baking oven. In Fig. 1 we have illustrated such rolls 27 at the end of the cracker and arranged to deliver the dough strips upon the oven conveyor 23ª.

The scoring rolls 27 (see Fig. 7) advantageously may be cylindrical rolls, each having a rib 27ª thereon between which the dough strip passes. The rotation of these rolls, driven by any suitable means, as for example a spur gear 27ᵇ, on the oven conveyor idle roll 23ᵇ, is adapted periodically to squeeze the dough at certain spaced intervals, preferably without breaking the continuity of the strip. After final baking the rolls 24 will act to break the strips along the scored lines so that the crackers or biscuits will be of predetermined length.

However, no serious effects result if the strips are severed by the rolls 27, owing to the fact that they are thereby deposited upon the continuously moving conveyor 23ᵇ of the oven. Hence, according to the invention, the rolls 27 may sever the strips into sections of desired length, in which case the final breaker rolls 24 may be dispensed with.

Referring further to the strip-forming machine, successful results are obtained by reason of the fact that the distributing conveyor screw 14 is driven at a slower speed than the feeding conveyor screw 12, and that means are provided to vary the speed of the distributing screw with respect to the speed of rotation of the conveyor screw 12. This may be simply and advantageously accomplished by means of the driving mechanism illustrated in Figs. 3 and 4.

For example, an electric motor 30 may have a chain drive with the constant speed shaft 31 of a Reeves variable speed transmission 32. The variable speed shaft 33 of the transmission 32 is connected by chain and sprocket 34 to the reduction gearing 13 to drive the feeding screw 13. The constant speed shaft 31 is also connected by a chain and sprocket drive 35 with the constant speed shaft 36 of a second Reeves variable speed transmission 37, the variable speed shaft 38 of which is connected to a suitable speed reducing gearing 39, driving a jack shaft 40 which in turn drives the distributing worm 14 by means of chain and sprocket drives 41. Thus the speed of the feeding conveyor screw may be varied by manipulation of the adjusting screw 32ª and the speed of the distributing screw conveyor may be independently variably adjusted and controlled by manipulation of the adjusting screw 37ª of the transmission 37. The details of construction of the transmissions 32 and 37 are not illustrated and described because they are well known to the trade as Reeves variable speed transmissions. The reducing gear 39 may be of any desired type, that illustrated being of the straight line spur gear type.

The independent variable speed drive for the distributing conveyor screw 14 is highly advantageous as it provides for adjusting the speed of the screw to prevent packing up of dough at the ends of the casing 13, while permitting the use of a uniform diameter screw to insure a uniform distribution of pressure along the length of the casing 13, resulting in a plurality of dough strips of uniform characteristics across the entire length of the casing 13.

Any desired means may be adopted for the drive of the conveyor 20 and associated conveyors between the strip-forming machine and oven. Preferably the speed of the conveyor 20 is slightly in excess of the speed of the extruded dough ribbons so as to prevent folding of the green ribbons.

In the illustrated example, a variable speed drive is provided for the conveyor 20 and cooker 21, which is substantially identical with the drive for the feeding conveyor screw 12 and therefore is not illustrated in detail. The conveyor drive diagrammatically illustrated in Figs. 1 and 2, includes a motor 45, driving a Reeves variable speed transmission 46, which in turn drives a worm and gear reducing gear 47 for driving one of the rolls 21$^c$ of the cooker conveyor 21$^b$. The opposite end of the roll 21$^c$ may be fitted with a sprocket connected by chain 48 for driving the roll 20$^a$ of the conveyor. It will be obvious that when the cooker is not used, the driving mechanism 45, 46, and 47 may be connected directly to the driving roll of the conveyor 20.

The advantages of our invention will be apparent to those skilled in the art. The strip-forming mechanism of our invention is capable of producing a plurality of dough ribbons of desired shape and size and without limit in number. Hence the number of ribbons is limited only by the width of the conveyors. The strips thus formed are moved continuously to and through the oven where they are quickly baked. The invention makes possible the production of highly satisfactory products at a minimum of expense.

We claim:

1. The method of making crackers, biscuits and the like which comprises continuously extruding dough to form a plurality of strips of green dough material arranged in horizontal alignment, collectively rolling the continuous dough strips to wafer form, scoring the strips into sections of desired length, continuously conveying the continuous rolled strip and progressively baking said strips without disturbing the continuity thereof, and then breaking the strips into articles of desired length.

2. Apparatus for the manufacture of crackers, biscuits and the like comprising a dough hopper, means communicating with the hopper for subjecting a batch of dough to a desired pressure, means conveying said dough under pressure horizontally and forcing said dough through die openings to form a plurality of continuous strips of dough in transverse horizontal alignment, a conveyor for receiving the continuous dough strips, and conveying them to an oven while maintaining the continuity and transverse alignment of said strips, an elongated baking oven, and means for continuously conveying said continuous strips of dough through the oven.

3. Apparatus for the manufacture of crackers, biscuits and like articles, comprising in combination, means for forming a plurality of continuous dough strips and discharging them in substantial transverse horizontal alignment, means for scoring said dough strips to make said continuous strips into sections of predetermined length, an elongated baking oven, and means for continuously conveying said continuous strips of dough from the strip forming means continuously through said oven.

4. Apparatus for the manufacture of crackers, biscuits and like articles, comprising in combination, means for forming a plurality of continuous dough strips and discharging them in substantial transverse horizontal alignment, means for collectively rolling said dough strips into wafer form of desired width and thickness, an elongated baking oven, and means for continuously conveying said strips of dough from the strip-forming means continuously through said oven.

5. In an apparatus for the manufacture of crackers, biscuits and like articles, means for forming a plurality of continuous dough strips and discharging them in transverse horizontal alignment, said means comprising a hopper, a conveyor for moving dough from said hopper and subjecting it to pressure, a distributor casing communicating with said conveyor for receiving dough therefrom, said casing having a plurality of die openings on one side thereof, a worm distributing conveyor within said casing for distributing the dough uniformly therethrough, means for rotating the distributing conveyor, and means for variably controlling the speed of rotation of the distributing conveyor independently of the first named conveyor.

6. In an apparatus for the manufacture of crackers, biscuits and like articles, means for forming a plurality of continuous dough strips and discharging them in transverse horizontal alignment, said means comprising a hopper, a conveyor for moving dough from said hopper and subjecting it to pressure, a distributor casing communicating with said conveyor for receiving dough therefrom, said casing having a plurality of die openings on one side thereof, a worm distributing conveyor within said casing for distributing the dough uniformly therethrough, means for rotating the distributing conveyor at a speed slower than the first named conveyor, and means for variably controlling the speed of rotation of the distributing conveyor independently of the first named conveyor.

7. In an apparatus for the manufacture of crackers, biscuits and like articles, means for forming a plurality of continuous dough strips and discharging them in transverse horizontal alignment, said means comprising a hopper, a feeding conveyor connected to said hopper for feeding dough therefrom and subjecting it to pressure, a casing connected centrally to one end of said feeding conveyor and disposed at right angles therewith, said casing having die openings on one face thereof substantially throughout the length thereof, a distributing screw conveyor rotatably mounted in said casing for uniformly feeding and distributing dough throughout said casing and forcing it through said die openings at substantially uniform pressure, the flutes of said screw conveyor being oppositely inclined on opposed sides of said feeding conveyor for feeding the dough from said feeding conveyor in opposite directions, and means for variably controlling the speed of said distributing screw conveyor independently of said feeding conveyor.

8. The method of making crackers, biscuits and the like which comprises providing a supply of green dough, continuously distributing dough from said supply uniformly, again distributing said dough transversely in opposite directions and continuously extruding dough in the form of a plurality of horizontally disposed strips in a direction substantially at right angles to the transverse distribution, moving a plurality of extruded dough strips in substantial horizontal alignment through a baking atmosphere while maintaining all surfaces of said strips exposed to said baking atmosphere, and then breaking the long strips of baked material into sections of desired length.

9. The method of continuous manufacture of crackers, pretzel sticks and the like which comprises providing a supply of green dough, feeding the dough from said supply uniformly in a continuous stream, distributing the dough from said feed in a transverse direction and under a uniform pressure, continuously extruding dough from said transverse distribution and in a direction at right angles thereto to provide a plurality of dough strips arranged in a horizontal row, continuously moving said continuous strips of dough and progressively baking them, and finally breaking the baked continuous strips into sections of desired length.

ALLEN B. HOLTZMAN.
DAVID SCHELL.